UNITED STATES PATENT OFFICE.

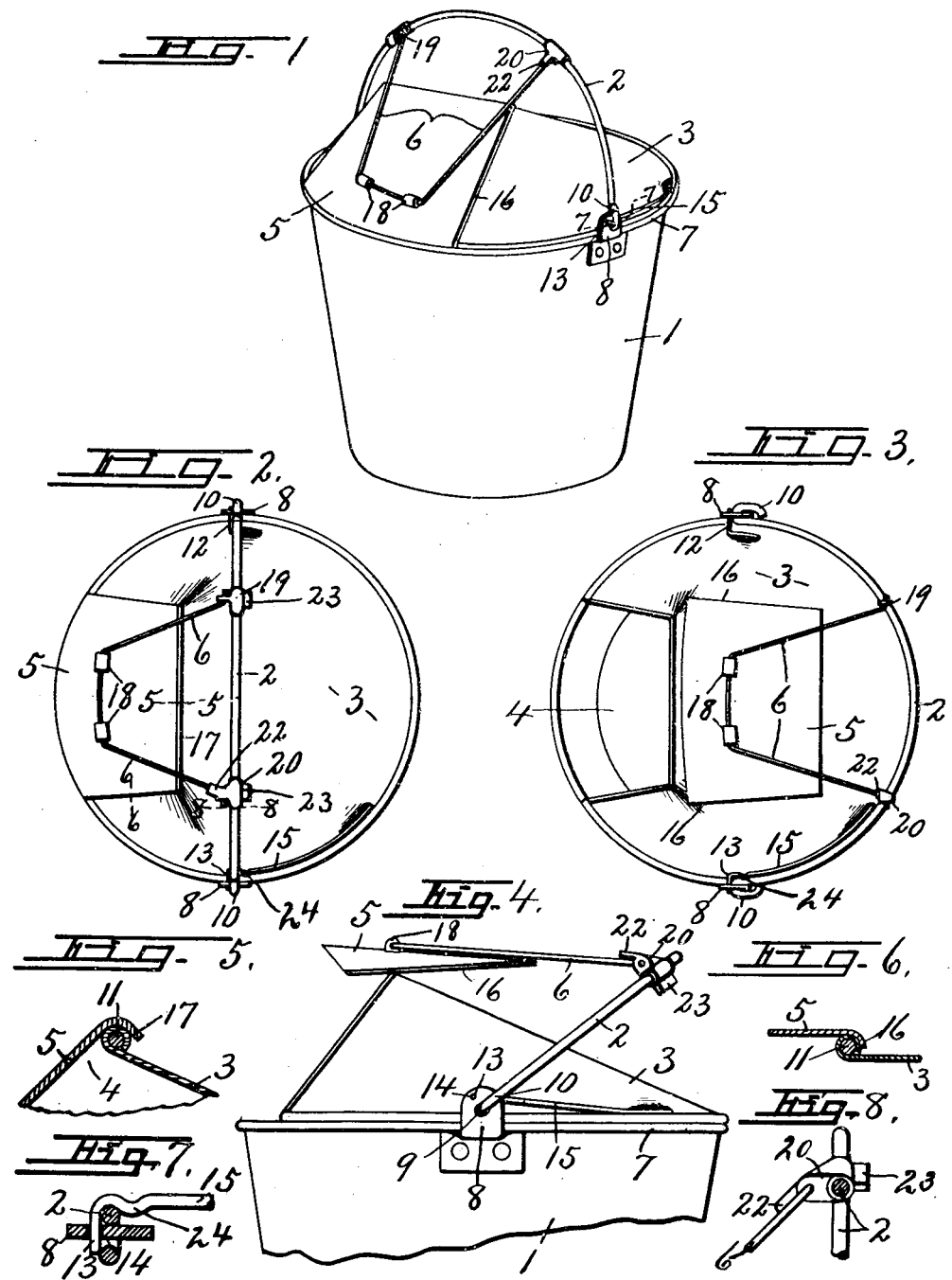

HERBERT J. BROWN, OF GEORGETOWN, NEW YORK.

MILK-PAIL.

1,046,730.  Specification of Letters Patent.  Patented Dec. 10, 1912.

Application filed May 2, 1912. Serial No. 694,653.

*To all whom it may concern:*

Be it known that I, HERBERT J. BROWN, of Georgetown, in the county of Madison, in the State of New York, have invented new and useful Improvements in Milk-Pails, of which the following, taken in connection with the accompanying drawings, is a full, clear, and exact description.

This invention relates to certain improvements in milk pails of the hooded cover type in which a relatively small portion of the front side of the cover inclines upwardly and rearwardly in a substantially flat plane and is provided with a proportionately sized opening for the reception and discharge of the milk, the remaining portions of the cover being inclined downwardly from the upper side of the opening to the rim of the pail to effectively prevent the entrance of dust or other foreign matter to the interior of the pail except through the relatively small opening.

During the operation of milking, as each pail is filled or partially filled with milk, it is usually set aside in the stables while others are being similarly filled and unless some means is provided to close this relatively small opening through which the milk is projected during the milking operation, more or less dust, hair, chaff and other foreign matter will lodge in the milk through such opening, and the main object of my present invention is to provide simple means for automatically closing this opening when the pail is lifted by the bail in the act of setting it aside or carrying it from place to place and also to enable the closure to be automatically opened by the dropping of the bail in the operation of milking. In other words I have sought to provide the opening with a suitable closure connected to the bail in such manner as to lie flatwise across the opening when the bail is lifted and to lie flatwise across the upper surface of the cover at the rear of the opening when the bail is dropped, thereby avoiding any objectionable encumbrance or hindrance to the free use of the pail in the ordinary manner. For example, in milking into the pail with the latter held between the knees or in any other convenient manner it is always customary to drop the bail by which act the lid is shifted clear of the opening, while on the other hand in emptying the pail it is always customary to hold the bail in one hand while the pail is tilted relatively thereto, thereby drawing the bail toward the rear and similarly opening the lid, the lid being automatically closed by the raising of the bail in the act of carrying the pail from place to place or when standing in the stable or other place.

Another object is to make the cover entirely separate from the pail so that the interiors of both the pail and cover may be maintained in a more thoroughly sanitary condition by washing and sterilizing.

A further object is to provide simple means for firmly holding the cover in operative position upon the rim of the pail and permitting it to be removed when necessary.

A still further object is to provide means for holding the lid against vibratory movement when in its closed position.

Other objects and uses will be brought out in the following description.

In the drawings—Figure 1 is a perspective view of a milk pail embodying the various features of my invention. Figs. 2 and 3 are top plans of the same pail, the lid being closed in Fig. 2 and opened in Fig. 3. Fig. 4 is an enlarged side elevation of the upper portion of the same pail showing the lid in its partially opened position. Figs. 5 and 6 are enlarged detail sectional views through portions of the lid and cover taken respectively on lines 5—5 and 6—6, Fig. 2. Fig. 7 is an enlarged horizontal sectional view through one of the ears of the pail taken on line 7—7 Fig. 1, showing the adjacent end of the spring locking member and bail stop. Fig. 8 is an enlarged detail sectional view taken on line 8—8 Fig. 2 showing one of the connections between the bail and lid supporting link and the stop for holding the link and lid in their closed positions.

This pail comprises a main body —1— having a bail —2— and a hooded cover —3—, the front side of the latter being inclined upwardly and rearwardly and provided with an opening —4— adapted to be closed by a movable lid —5— which is connected to the bail by a U-shape link —6—. The main body —1— may be of any form or size having its upper edge reinforced by an overturned rim or roll —7— disposed in a substantially flat horizontal plane. The sides of the pail are provided with upturned ears or lugs —8— having apertures —9— for the reception of the adjacent ends of the bail —2—, said ears or lugs being located substantially midway between the front and rear of the pail so as to balance the latter when supported by the bail.

The bail —2— preferably consists of a semi-circular wire of substantially the same radius as the rim of the pail or main body —1— and its opposite ends are provided with loops —10— for interlocking engagement in the apertures —9—, thus permitting the bail to assume a position substantially co-incident with that of the rim of the pail when in its down position.

The cover —3— is somewhat conical or pyramidal with its apex uppermost and some distance to the front of the vertical plane of the loop or ears —8— and bail —2— when the latter is in a vertical position, the central portion of the front side being cut away to form the opening —4— extending from the apex to the periphery of the cover. The base of the cover is of substantially the same diameter as that of the rim of the pail and is disposed in a substantially flat plane so as to fit snugly upon said rim when the cover is in operative position, thereby closing the entire open side of the main body —1— except as to the relatively small opening —4— through which the milk may be projected into or discharged from the pail. The periphery of the base of the cover and also the portions surrounding the opening —4— are reinforced by comparatively stiff wire —11— so as to maintain the form of the cover.

As previously intimated, the front side of the cover in which the opening —4— is located is disposed in a substantially flat plane inclined upwardly and rearwardly at an angle of substantially 45° so as to permit the streams of milk from the udder of the cow to be easily projected into the interior of the pail during the operation of milking.

The cover is held in operative position upon the rim of the pail by means of radially projecting pins —12— and —13—, one of the pins as —12— being rigidly secured by soldering or otherwise to the adjacent sides of the cover and projects laterally or radially beyond the rim and through a suitable aperture —14— in the adjacent lug or ear —8—, the other pin —13— being mounted upon one end of a spring arm —15— having its other end rigidly secured by soldering or otherwise to the cover —3— some distance to the rear of the adjacent ear or lug —8— so as to allow the pin —13— to be sprung into and out of an aperture —14— in said ear. These apertures —14— are located just above and at the front of the apertures —9— which receive the ends of the bail —2— so as to form limiting stops for said bail when the latter is moved to its vertical position. That is, the spring —15— of which the pin —13— forms a part and the inner end of the pin —12— which is secured to the cover —3— are spaced apart from their respective ears —8— a sufficient distance to permit the adjacent portions of the bail to play freely in the intervening space.

The lid —5— is of substantially the same form as but slightly greater than the area of the opening —4— so as to entirely cover the latter when in its closed position, the lower edge of said lid being curved to conform to the adjacent portion of the rim of the pail over which it is adapted to lie. The opposite side edges of the lid are provided with inwardly deflected reinforcing ribs —16— lapping upon and slidable along the corresponding sides of the opening —4— the upper edge of said lid being also provided with an inturned reinforcing rib —17— forming a stop for engaging the upper side of the opening to limit the downward movement of the lid, these reinforcing ribs serving also to more effectively exclude dust or other foreign matter from entrance to the interior of the pail through the joints.

The U-shaped link —6— is preferably made of wire having its intermediate portion passed through and hinged to suitable eyes or loops —18— on the central portion of the lid —5— and its opposite ends hinged to suitable brackets or attaching members —19— and —20— on the bail —2— equidistant from and at opposite sides of its center in such manner as to cause the opposite arms of the link to overlie the upper portion of the lid is shown more clearly in Figs. 2 and 3. This link is preferably disposed in a flat plane substantially parallel with that of the lid when the latter is in its closed position and the bail in a vertical position so as to cause the intermediate portions of the link to bear against the lid for holding the latter in its closed position.

The brackets —19— and —20— are provided with apertured lugs for the reception of the adjacent ends of the link —6— which is preferably made of spring metal tensioned so as to hold the ends of the link in operative engagement with the lugs and at the same time permitting the ends of the links to be sprung toward each other to disconnect the lid from the bail if necessary or when the cover is removed and the pail used in the usual manner, in which case it will, of course, be necessary to disengage the locking members —12— and —13— from the lugs or ears —8— by simply springing the pin —13— inwardly against the action of the spring —15— until it is disengaged from the adjacent lug —8— and then shifting the cover radially so as to disengage its other pin —12— from the corresponding ear —8—. As a further means for holding the lid in its closed position when the bail is up, I provide the bracket or connection —20— with a forwardly projecting stop finger —22— arranged so as to lie flat against the upper face of the adjacent side of the link —6— when the lid is raised to its vertical position as shown more clearly in Fig. 8.

Secured to the bail and preferably to one or both of the brackets or connections —19— and —20— are stop shoulders —23— projecting from the underside of the bail to engage the rim of the cover —3— for holding the central portion of the bail a sufficient distance above said rim to enable it to be engaged by the fingers when in its bent position.

The spring —15— carrying the locking pin —13— is tensioned outwardly so as to frictionally engage the inner side of the adjacent portion of the bail to hold the latter in its elevated position when brought against the stop —13— and in order that this holding means may be more effective, the portion of the spring adjacent the bail is depressed laterally for forming a locking shoulder —24— shown more clearly in Figs. 2, 3 and 7.

In assembling the cover and its lid upon the pail, it is simply necessary to rest the rim of the cover upon the rim of the pail and slide it diametrically into position to insert the locking member —12— into its aperture in the adjacent ear —8— and to then spring the other locking member —13— inwardly and release it to allow it to enter the aperture in the corresponding ear of the pail. The ends of the link —6— are then attached in the manner described to their corresponding lugs or brackets —19— and —20—.

When lifting the pail by the bail as in carrying it from place to place or setting it down before or after milking the lid will be automatically closed and together with the bail held in this position by the spring —15— and pressure finger —22—. On the other hand in the act of milking when the bail is forced to its down position, the lid will be automatically opened to the position shown in Fig. 3 in which it rests flatwise directly upon the upper side of the cover being forced to this position by its own gravity after being drawn rearwardly from its balanced position shown in Fig. 4, the link —6— bearing against the upper front side of the lid tending to force it downward or flatwise against the top of the cover as the bail is drawn rearwardly.

It is evident, however, that the various details of construction for carrying out the various objects may be varied without departing from the spirit of my invention.

What I claim is:

1. A milk pail having a bail hinged to its opposite sides, a cover having its front side inclined upwardly and rearwardly and provided with an opening, a lid slidable on the cover across said opening in the direction of movement of the bail and a link flexibly connected to the bail and to the cover to effect such sliding movement.

2. A milk pail having a bail hinged to the opposite sides thereof and movable to and from a vertical position, a cover having its front side inclined upwardly and rearwardly and provided with an opening wholly to the front side of the vertical position of the bail, a stop-pin on the cover for limiting the forward movement of the bail to an upright position, a lid slidable across the opening in the direction of movement of the bail and a link flexibly connected to the bail and to the lid for effecting such sliding movement.

3. A milk pail having a bail hinged to opposite sides thereof, a cover having its front sides inclined upwardly and rearwardly and provided with an opening, a lid slidable on the front side of the cover across said opening in the direction of movement of the bail, a link having one end hinged to the bail and its opposite end hinged to the lid to effect such sliding movement and a stop-shoulder on the bail for engaging and depressing said link to tilt the cover downwardly at the rear side of the opening when the bail is rocked rearwardly and downwardly.

4. A milk pail having a bail hinged to opposite sides thereof, a movable cover having its front side inclined upwardly and rearwardly and provided with an opening, movable means on the cover interlocking with a portion of the pail to hold the cover in operative position, a lid slidable on the front of the cover across said opening in the direction of movement of the bail and a link having one end pivotally connected to the bail and its opposite end pivotally connected to the lid for effecting such sliding movement.

In witness whereof I have hereunto set my hand on this 22d day of April, 1912.

HERBERT J. BROWN.

Witnesses:
B. FRED SAUNDERS,
B. E. ROSS.